US008880914B2

(12) United States Patent
Fujisaki et al.

(10) Patent No.: US 8,880,914 B2
(45) Date of Patent: Nov. 4, 2014

(54) INFORMATION PROCESSING APPARATUS AND JUDGING METHOD

(75) Inventors: Koichi Fujisaki, Kanagawa (JP); Tatsunori Kanai, Kanagawa (JP); Tetsuro Kimura, Tokyo (JP); Haruhiko Toyama, Kanagawa (JP); Satoshi Shirai, Kanagawa (JP); Masaya Tarui, Kanagawa (JP); Hiroyoshi Haruki, Kanagawa (JP); Akihiro Shibata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 413 days.

(21) Appl. No.: 13/420,814

(22) Filed: Mar. 15, 2012

(65) Prior Publication Data

US 2012/0246503 A1 Sep. 27, 2012

(30) Foreign Application Priority Data

Mar. 24, 2011 (JP) ................................. 2011-066658

(51) Int. Cl.
*G06F 1/26* (2006.01)
*G06F 1/28* (2006.01)
*G06F 1/32* (2006.01)

(52) U.S. Cl.
CPC ............... *G06F 1/26* (2013.01); *G06F 1/3212* (2013.01); *G06F 1/28* (2013.01)
USPC .............................................. 713/300; 713/1

(58) Field of Classification Search
CPC ............ G06F 1/26; G06F 1/28; G06F 1/3212
USPC ..................................................... 713/1, 300
See application file for complete search history.

(56) References Cited

U.S. PATENT DOCUMENTS

| 7,035,953 | B2* | 4/2006 | Krontz et al. ................. 710/302 |
| 8,694,813 | B2* | 4/2014 | Shayer ......................... 713/323 |
| 8,707,002 | B2* | 4/2014 | Ueda ............................ 711/167 |
| 2007/0083780 | A1 | 4/2007 | Aoyagi et al. |
| 2010/0011229 | A1* | 1/2010 | Davis et al. .................. 713/300 |
| 2013/0091372 | A1* | 4/2013 | Kimura et al. ............... 713/340 |

FOREIGN PATENT DOCUMENTS

| JP | 2004362426 | 12/2004 |
| JP | 2007102670 | 4/2007 |
| JP | 2010-044460 A | 2/2010 |
| JP | 2010-117984 A | 5/2010 |

OTHER PUBLICATIONS

Japanese Office Action for Japanese Application No. 2011-066658 mailed on Mar. 5, 2013, 9 pages.
Meisner, et al. PowerNap: Eliminating Server Idle Power, ACM ASPLOS, 2009.
Japanese Office Action for Japanese Application No. 2011-066658 mailed on Nov. 20, 2012.

* cited by examiner

*Primary Examiner* — Mark Connolly
(74) *Attorney, Agent, or Firm* — Amin, Turocy & Watson, LLP (57) ABSTRACT

According to one embodiment, an information processing apparatus includes a processor, a non-volatile storage unit, a receiving unit, a judging unit, and a transmitting unit. The receiving unit receives from the processor an inquiry about accessibility of the storage unit. The judging unit judges, upon receipt of the inquiry, whether the storage unit is accessible on the basis of a start-up time period between starting power supply to the storage unit and activation of the storage unit. The transmitting unit transmits a judgment result obtained by the judging unit to the processor.

8 Claims, 6 Drawing Sheets

INFORMATION PROCESSING APPARATUS AND JUDGING METHOD

CROSS-REFERENCE TO RELATED APPLICATION

This application is based upon and claims the benefit of priority from Japanese Patent Application No. 2011-066658, filed on Mar. 24, 2011; the entire contents of which are incorporated herein by reference.

FIELD

Embodiments described herein relate generally to an information processing apparatus and a judging method.

BACKGROUND

In the field of embedded devices such as consumer electronics devices, a power saving technique is known in which the operating voltage of a processor of an embedded device is dynamically lowered or the operating frequency is lowered when the amount of processing performed by the processor is small. In addition, a technique of shutting off the power to a device when no access is made thereto within a designated period of time is also known.

Furthermore, a method of saving power by shifting to a mode called "sleep" when there is no input (e.g., keyboard input) from a user within a certain period of time is known. In the sleep mode, the operating frequency and the supply voltage of a processor are reduced, and the processor is thereby shifted to a low power consumption mode so that the power consumption can be reduced. With this method, the state of the processor and the information in a volatile memory are stored in the device, and thus the normal mode can be recovered in a short time in response to the user's input.

In a mode called "hibernation," unlike in the sleep mode, the information of the processor and the memory is stored in a non-volatile storage device (such as a hard disk), and then the power to the processor and the memory is shut off so that a mode of still lower power consumption than the sleep mode can be achieved. If the user presses a power switch during the hibernation mode, the embedded device judges that the user has instructed a shift from the hibernation mode to the normal mode. The embedded device reads the state of the processor and the information in the memory stored in the storage device and writes them back onto the processor and the memory, so that the mode previous to the hibernation mode can be recovered.

As described above, techniques of reducing power consumption when the user is not using the device have been developed. When there is no input from the user within a predetermined period of time, the device is shifted to the sleep mode or the hibernation mode for reducing the power consumption.

Meanwhile, even when the user is performing input, there is a period of time, in units of several milliseconds, in which the processor or the device is not in operation. The speed of typing performed by a human being is one hit at most in several tens of milliseconds. Thus, when the user is typing on the keyboard, the processor may be in a no-task state (i.e., in an idle mode), until the next key is pressed down. If the power to the processor or the memory can be shut off in units of several milliseconds without waiting for the predetermined period of time to elapse unlike in the conventional technologies, the power consumption can be further reduced.

DETAILED DESCRIPTION

In general, according to one embodiment, an information processing apparatus includes a processor, a non-volatile storage unit, a receiving unit, a judging unit, and a transmitting unit. The receiving unit receives from the processor an inquiry about accessibility of the storage unit. The judging unit judges, upon receipt of the inquiry, whether the storage unit is accessible on the basis of a start-up time period between starting power supply to the storage unit and activation of the storage unit. The transmitting unit transmits a judgment result obtained by the judging unit to the processor.

Exemplary embodiments of an information processing apparatus are explained in detail below with reference to the attached drawings.

First Embodiment

In an information processing apparatus according to a first embodiment, part of a memory bus, which connects the processor to a non-volatile memory, is connected to a state monitoring unit that monitors the state of the memory. The processor inquires of the state monitoring unit about the state of the memory when recovering from a sleep mode, and makes an access to the memory only after the memory becomes accessible.

Figure 1:
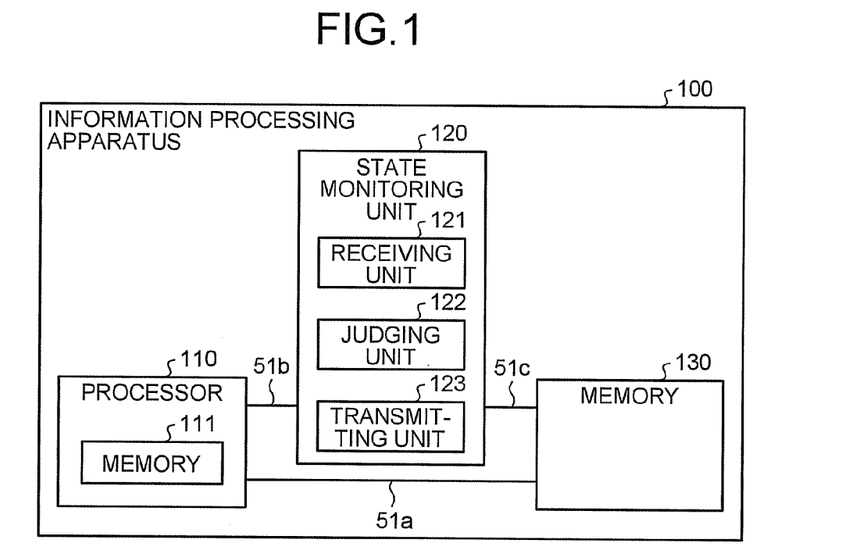
FIG. 1 is a block diagram of an information processing apparatus according to a first embodiment.

FIG. 1 is a block diagram showing an example structure of an information processing apparatus 100 according to the first embodiment. As indicated in FIG. 1, the information processing apparatus 100 includes a processor 110, a memory 130, and a state monitoring unit 120.

The memory 130 is a non-volatile storage unit that serves as a main memory of the processor 110. The state monitoring unit 120 judges the state of the memory 130 and sends the judgment result to the processor 110.

The processor 110 and the state monitoring unit 120 are connected to each other by a bus 51*b* of the memory bus, to which part of addresses is assigned for state monitoring. The memory 130 and the processor 110 are connected to each other by a bus 51*a*, which is part of the memory bus other than the bus 51*b*. The state monitoring unit 120 and the memory 130 are connected to each other by a bus 51*c*, to which an address corresponding to that of the bus 51*b* is assigned. The buses 51*a* and 51*b* or the buses 51*a* and 51*c* correspond to one memory bus.

The processor 110 includes a memory 111. The memory 111 is a volatile or non-volatile memory. For example, the memory 111 may be a cache memory or a storage unit that stores therein small-sized programs.

The processor 110 executes the operating system and application software programs. The processor 110 uses the memory 130 as a main memory. The processor 110 also controls the power to each unit of the information processing apparatus 100. For example, the processor 110 controls the power supply (power-on) and power shutoff (power-off) to the memory 130.

In order for the processor 110 to turn the power of the memory 130 on/off within an idle time that appears in the processor 110 in units of several milliseconds, there is no time for the information stored in the memory 130 to move to another storage device. For this reason, a non-volatile memory is indispensible to prevent the retained information from being erased after the power is shut off. Thus, a non-volatile memory is adopted for the memory 130 according to the present embodiment. As a result, when the processor 110 becomes idle, the power to the memory 130 can be immediately shut off without having to move the information stored in the memory 130 somewhere else. The power to the memory 130 can be turned off for each short period of time, and the power consumption of the information processing apparatus 100 can thereby be reduced.

Although it is omitted from FIG. 1, the information processing apparatus 100 may include, as in an ordinary personal computer, a data input unit such as a keyboard, a mouse, a touch panel, and a network interface. Furthermore, the information processing apparatus 100 may include a displaying unit for displaying data, such as a liquid crystal display.

Next, the state monitoring unit 120 is explained in detail. The state monitoring unit 120 includes a receiving unit 121, a judging unit 122, and a transmitting unit 123. The receiving unit 121 receives, from the processor 110 by way of the bus 51*b*, an inquiry as to whether the memory 130 is accessible. Then, the receiving unit 121 notifies the judging unit 122 that the inquiry as to whether the memory 130 is accessible has been received. The inquiry includes the time at which the processor 110 starts supplying the power to the memory 130 (power-on time). The processor 110 may send the power-on time, separately from the inquiry, to the state monitoring unit 120.

Upon receipt of the inquiry (i.e., when receiving the notification that the inquiry about the accessibility of the memory 130 has been received from the receiving unit 121), the judging unit 122 judges whether the memory 130 is accessible. For example, the judging unit 122 judges whether the memory 130 is accessible by use of time between starting the power supply to the memory 130 and activation of the memory 130 (start-up time period). Furthermore, the judging unit 122 may be provided with a function of counting the number of clock signals of the state monitoring unit 120 after the power supply to the memory 130 is started. When the receiving unit 121 receives from the processor 110 the inquiry as to whether the memory 130 is accessible, the judging unit 122 may judge the accessibility on the basis of the number of clock signals. The judging unit 122 notifies the transmitting unit 123 of the judgment result.

For example, the state monitoring unit 120 inputs the start-up time period of the memory 130 and stores it in an internal storage unit (not shown) in advance. Upon receipt of the inquiry regarding the accessibility, the judging unit 122 judges whether a time period that corresponds to the start-up time period has elapsed since the power-on time. If the time period corresponding to the start-up time period has elapsed since the power-on time, the judging unit 122 judges that the memory 130 is accessible. The reference time point is not limited to the power-on time. For example, the inquiry receipt time may be used as a reference for the judgment.

The transmitting unit 123 sends the judgment result obtained by the judging unit 122, i.e., the information regarding the accessibility of the memory 130, to the processor 110 by way of the bus 51*b*.

Next, an operation of the information processing apparatus 100 that adopts the non-volatile memory 130 as a main memory during a low power consumption mode is explained.

When waiting for data to be input from the not-shown keyboard or through the network, there is no processing to be performed, and therefore the processor 110 is shifted to the idle state. When the processor 110 is in the idle state, no access is made to the memory 130, and therefore the power to the memory 130 can be shut off.

When shifting to the idle state, the processor 110 checks to see if the program necessary for controlling the power to the memory 130 (power controlling program) is stored in the memory 111. If the power controlling program is not stored in the memory 111, the processor 110 reads the power controlling program from the memory 130 and stores it in the memory 111 of the processor 110.

Next, the processor 110 executes the power controlling program to control the power to the memory 130 and shut the power off to the memory 130. Because the memory 130 is a non-volatile memory, the stored information would not be erased after the power is shut off.

As discussed above, by adopting a non-volatile memory for the memory 130, the power to the memory 130 can be quickly shut off without having to move, the information stored in the memory 130 somewhere else. When no access is made from the processor 110 to the memory 130, the power to the memory 130 is immediately shut off so that the power consumption on the information processing apparatus 100 can be reduced. Even when the power to the memory is shut off in a state where the power to the process is supplied, an access can be properly made from the processor to the memory.

Figure 2:
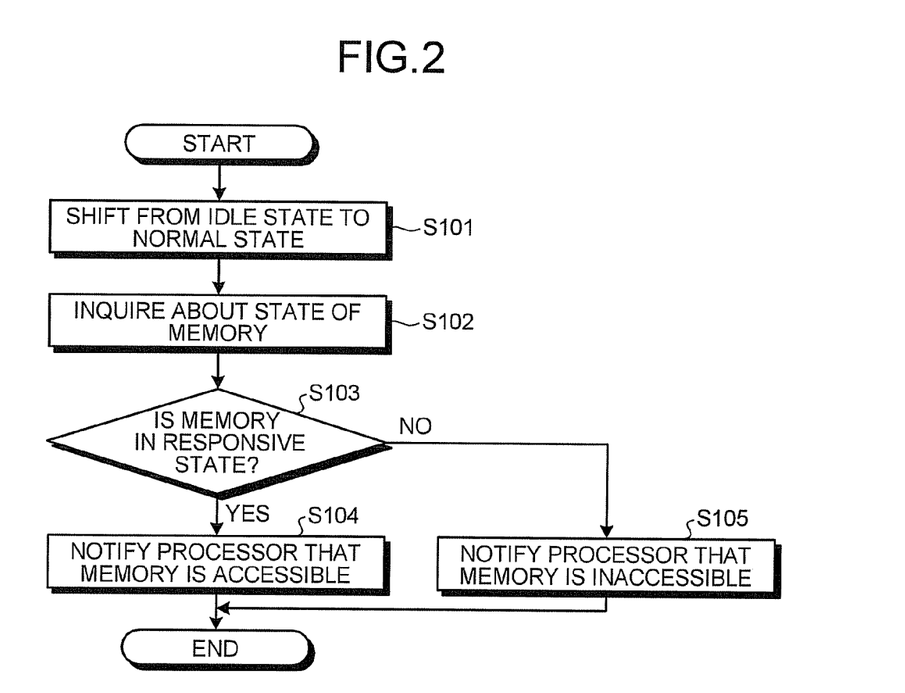
FIG. 2 is a flowchart of a recovering process in the first embodiment.

Next, an operation performed when data is input to the processor 110 in a state where the power to the memory 130 is shut off is explained. FIG. 2 is a flowchart of the entire recovering process in the first embodiment. The recovering process is to shift from the idle state to the normal state.

When data is input to the processor 110, the processor 110 shifts from the idle state to the normal state (step S101). The processor 110 turns the power on for the memory 130 in accordance with the power controlling program stored in the memory 111.

Considerations should be made if the power is to be turned on for the main memory while the processor is in operation. With the conventional technologies, no means for the processor to check the state of the main memory is provided on the memory bus that connects the processor to the main memory. This is because the conventional information processing apparatus is not intended to shut the power off to the main memory only, and therefore it is assumed that, when the processor is in operation, the main memory is always accessible. For this reason, the processor cannot check to see whether the main memory is accessible. Under such assumption, there is a possibility that, when the to-be-processed data is input, the processor may send a read or write request to the main memory through the memory bus before the main memory becomes ready.

The main memory cannot respond to an access request from an external source for a certain period of time after the power-on, which is required for the stabilization of the internal circuit. In other words, the main memory cannot receive any read or write request for the certain period of time.

As can be seen from the above, if an access is made from the processor 110 before the memory 130 becomes ready after the start-up, the memory 130 cannot make a normal response. For this reason, the processor 110 may not successfully read the program from the memory 130, and, when trying to execute the program that is not properly running, it may fall into an invalid command error state. As a result, the processor 110 has to execute an interrupt to deal with the invalid command. If an interrupt has to be executed to deal with an invalid command error each time the processor 110 goes into the idle state and the power to the memory 130 is shut off, the power is wasted.

According to the present embodiment, the state monitoring unit 120 is incorporated to input a period of time between the power-on of the memory 130 and the activation thereof. The explanation is given with reference to FIG. 2.

When shifting from the idle state to the normal state, the processor 110 first sends an inquiry about the state of the memory 130 to the state monitoring unit 120 to check the state of the memory 130 (step S102). The receiving unit 121 of the state monitoring unit 120 receives the inquiry. Then, it notifies the judging unit 122 that the inquiry has been received. The judging unit 122 judges whether the memory 130 is in a responsive (accessible) state (step S103). For example, the judging unit 122 judges whether the start-up time period of the memory 130 has elapsed since the power-on time. If a period of time corresponding to the start-up time period of the memory 130 has elapsed since the power-on time, the judging unit 122 judges that the memory 130 is accessible. If a period of time corresponding to the start-up time period of the memory 130 has not yet elapsed since the power-on time, the judging unit 122 judges that the memory 130 is not accessible.

The judging unit 122 may be provided with a function of counting the number of clock signals of the state monitoring unit after the power supply to the memory 130 is started. When the receiving unit 121 receives the inquiry about the accessibility of the memory 130 from the processor 110, the judging unit 122 may judge that it is accessible on the basis of the number of the clock signals.

When the memory 130 is accessible (yes at step S103), the transmitting unit 123 notifies the processor 110 that the memory 130 is accessible (step S104). When the memory 130 is inaccessible (no at step S103), the transmitting unit 123 notifies the processor 110 that the memory 130 is inaccessible (step S105).

The state monitoring unit 120 may be provided with the following function in addition to the above-described functions. For example, the memory 130 may require a set-up of the interface at start-up. Thus, the state monitoring unit 120 may control the bus that is necessary for setting up at the start-up of the memory 130 so that the interface of the memory 130 can be set up.

Modification

In FIG. 1, the state monitoring unit 120 is connected between the processor 110 and the memory 130. If the interface does not have to be set up for the memory 130 and the processor 110 is provided with a communication interface such as I2C or Universal Asynchronous Receiver Transmitter (UART), the state monitoring unit 120 does not have to be connected between the processor 110 and the memory 130, as illustrated in FIG. 3.

Figure 3:
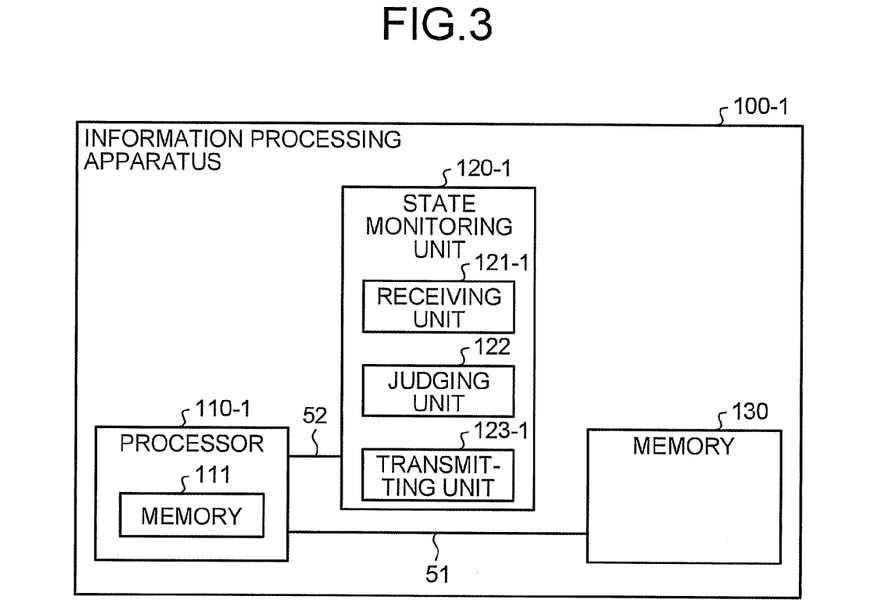
FIG. 3 is a block diagram of an information processing apparatus according to a modification of the first embodiment.

FIG. 3 is a block diagram showing an example structure of an information processing apparatus 100-1 according to a modification of the first embodiment. As illustrated in FIG. 3, the information processing apparatus 100-1 includes a processor 110-1, a memory 130, and a state monitoring unit 120-1. The structural components having the same functions as those of FIG. 1 are given the same numerals, and the explanation thereof is omitted here.

The processor 110-1 is connected to the state monitoring unit 120-1 by way of an interface 52 such as the UART, which is different from the processor 110 of FIG. 1. The state monitoring unit 120-1 is connected to the processor 110-1 by way of the interface 52, which is different from the state monitoring unit 120 of FIG. 1. The bus 51 corresponds to the combination of the buses 51a and 51b and the buses 51a and 51c in FIG. 1.

The receiving unit 121-1 receives an inquiry from the processor 110-1 by way of the interface 52, which is different from the receiving unit 121 of FIG. 1. The transmitting unit 123-1 transmits the judgment result to the processor 110-1 by way of the interface 52, which is different from the transmitting unit 123 of FIG. 1. In other words, according to this modification, it is through the UART or the like that the power-on time is received from the processor 110-1 and also that the inquiry about the state of the memory 130 sent from the processor 110-1 is responded to.

Second Embodiment

Figure 4:
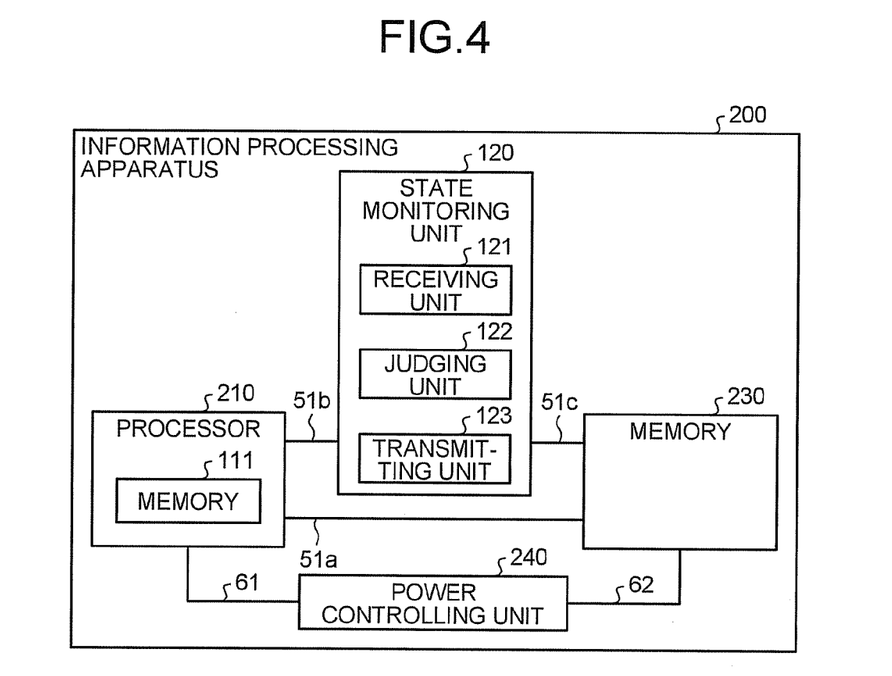
FIG. 4 is a block diagram of an information processing apparatus according to a second embodiment.

FIG. 4 is a block diagram showing an example structure of an information processing apparatus 200 according to a second embodiment. As illustrated in FIG. 4, the information processing apparatus 200 includes a processor 210, a memory 230, a state monitoring unit 120, and a power controlling unit 240.

The second embodiment is different from the first embodiment in the functions of the processor 210 and the memory 230. Furthermore, the power controlling unit 240 is added. The rest of the structure and the functions are the same as in the information processing apparatus 100 according to the first embodiment illustrated in the block diagram of FIG. 1, and thus the same numerals are assigned, and the explanation thereof is omitted.

The processor 210 and the memory 230 are connected to the power controlling unit 240 by way of signal lines 61 and 62.

According to the second embodiment, the power controlling unit 240 controls the power to the processor 210 and the memory 230. The power controlling unit 240 is connected to the processor 210 by the signal line 61 so as to be communicable. The power controlling unit 240 has a function of shutting the power off to the processor 210, the memory 230, and the state monitoring unit 120 when receiving from the processor 210 through the signal line 61 an instruction that the power to the processor 210 and the memory 230 may be shut off. Alternatively, the power controlling unit 240 may have a function of raising or lowering the voltage of the power.

When the processor 210 falls into a data input waiting state, it sends to the power controlling unit 240 an instruction to lower the voltage supply to the processor 210 or shut the power off to the processor 210, and an instruction to shut the power off to the state monitoring unit 120 and the memory 230.

When sending an instruction to the power controlling unit 240 to shut the power off to the processor 210 or to lower the voltage to a level for the operation of a power saving mode, in which information in the processor 210 cannot be retained, the processor 210 needs to save the information stored in the processor 210 into the memory 230 in advance. After writing the information required at the next start-up of the processor 210 into the memory 230, the processor 210 sends the power shut-off instruction to the power controlling unit 240. If the power supply voltage of the processor 210 is to be reduced to the lower limit for the information to be retained in the processor 210, the information in the processor 210 does not have to be saved. In such a case, immediately after falling into the idle state, the processor 210 sends an instruction to the power controlling unit 240 to lower the supply voltage of the processor 210 and shut the power off to the state monitoring unit 120 and the memory 230.

Next, when a key input is made by the user or data is received through the network, the power controlling unit 240 raises the power supply voltage of the processor 210, the state monitoring unit 120, and the memory 230. The power controlling unit 240 retains information in advance regarding the start-up time periods of the devices that are under the control of the power controlling unit 240. When the power supply voltage is to be raised, the power controlling unit 240 starts raising the power supply voltage of a device that takes the longest time for start-up on the basis of the retained information.

There is a case in which the processor 210 sends an instruction to lower the power supply voltage of the memory 230 only. In such a case, the power controlling unit 240 lowers the power supply voltage of the memory 230 only, and when an instruction to raise the voltage of the memory 230 is received from the processor 210, the power controlling unit 240 raises the power supply voltage of the memory 230. The problem as mentioned in the first embodiment arises when the power to the memory 230 is shut off in a state where the processor 210 is in operation. Thus, the occurrence of malfunction during the power-on of the memory 230 is prevented by use of the state monitoring unit 120.

Figure 5:
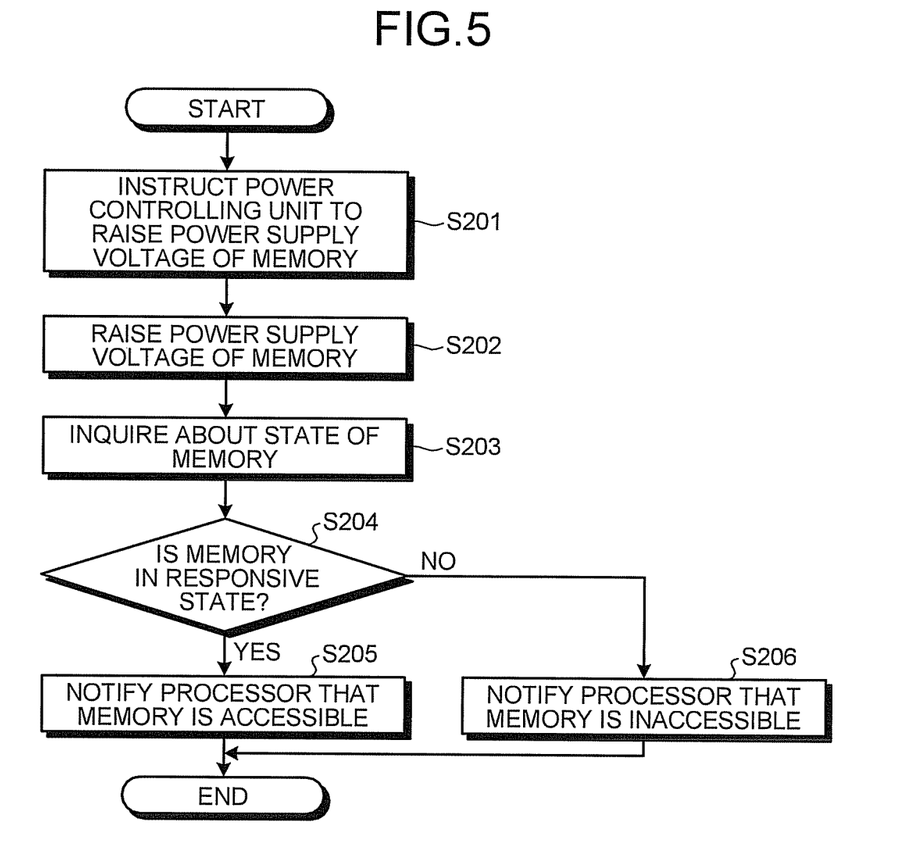
FIG. 5 is a flowchart of a recovering process in the second embodiment.

Next, the recovering process of the above information processing apparatus 200 according to the second embodiment is explained with reference to FIG. 5. FIG. 5 is a flowchart of the entire recovering process in the second embodiment.

The processor 210 gives an instruction to the power controlling unit 240 to raise the voltage of the memory 230 (step S201). In response to this instruction, the power controlling unit 240 raises the power supply voltage of the memory 230 (step S202). Thereafter, the processor 210 sends an inquiry about the state of the memory 230 to the state monitoring unit 120, and makes an access when it is accessible (steps S203 through S206).

The operations of steps S203 through S206 are the same as those of steps S102 through S105 in the information processing apparatus 100 according to the first embodiment, and therefore the explanation is omitted.

Modification

Figure 6:
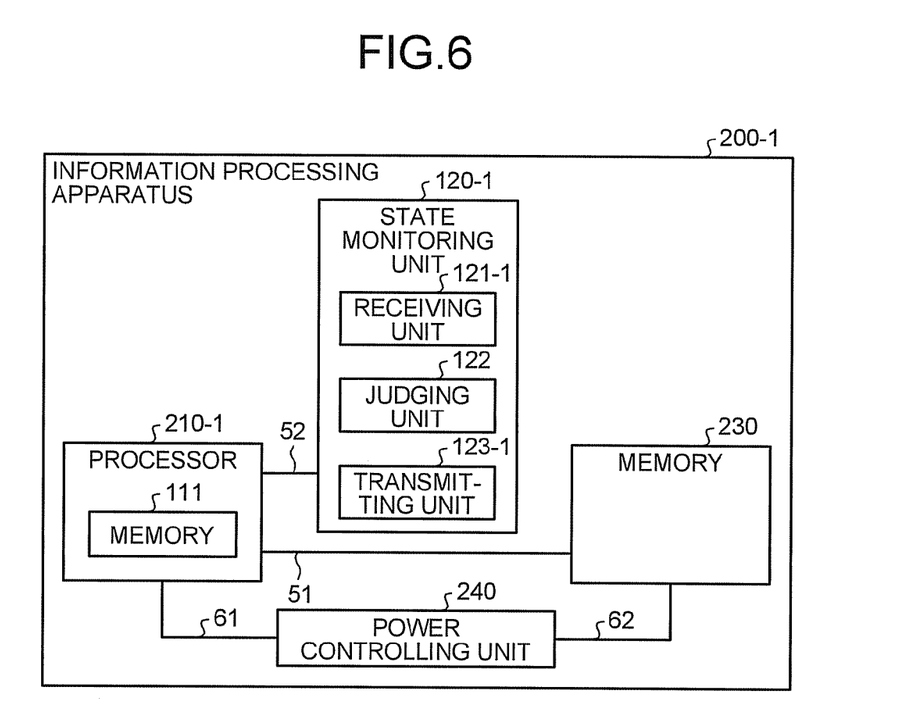
FIG. 6 is a block diagram of an information processing apparatus according to a modification of the second embodiment.

In FIG. 4, the state monitoring unit 120 is connected between the processor 210 and the memory 230. However, as in the modification of the first embodiment (FIG. 3), the state monitoring unit 120 does not have to be connected between the processor 210 and the memory 230. FIG. 6 is a block diagram showing an example structure of an information processing apparatus 200-1 according to a modification of the second embodiment. The structural components of FIG. 6 have the same functions as the components of FIG. 3 or 4, and thus the explanation thereof is omitted. As illustrated in FIG. 6, with the structure according to this modification, it is through the UART or the like that the power-on time is received from the processor 210-1 and an inquiry about the state of the memory 230 received from the processor 210-1 is responded to.

Third Embodiment

Figure 7:
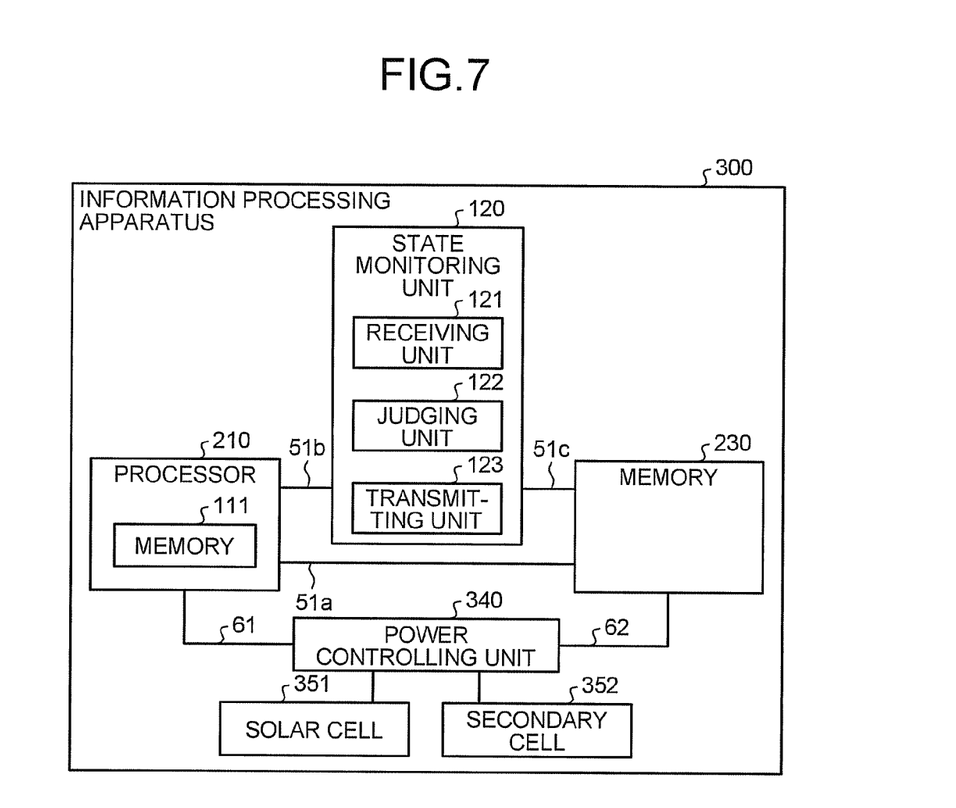
FIG. 7 is a block diagram of an information processing apparatus according to a third embodiment.

FIG. 7 is a block diagram showing an example structure of an information processing apparatus 300 according to a third embodiment. As illustrated in FIG. 7, the information processing apparatus 300 includes the processor 210, the memory 230, the state monitoring unit 120, a power controlling unit 340, a solar cell 351, and a secondary cell 352. In the structure according to the third embodiment, a solar cell 351, which serves as a power generating device, and a secondary cell 352 are added to the structure of the second embodiment (FIG. 4).

The information processing apparatus 300 includes the solar cell 351, and uses power generated by the solar cell 351 and power stored in the secondary cell 352 to operate.

The solar cell 351 converts optical energy into electrical power and outputs it. The secondary cell 352 functions as a power storage unit that stores the power output from the solar cell 351 and supplies the stored power to the structural components of the information processing apparatus 300 including the processor 210 and the memory 230. The power controlling unit 340 is differentiated from the power controlling unit 240 of the second embodiment in the additional function of controlling the power to the structural components in accordance with the amount of power generated by the solar cell 351 and the amount of power stored in the secondary cell 352.

The solar cell 351 that is adopted as a power generating device in the present embodiment does not usually exhibit a stable amount of electricity generation. The remainder of the electricity generated by the solar cell 351 after it is consumed by the processor 210 and the memory 230 is passed to charge the secondary cell 352. Thus, the amount of electricity in the secondary cell 352 varies in accordance with the user's usage condition and the amount of electricity generated by the solar cell 351. For this reason, when the operation is driven with the solar cell 351 and the secondary cell 352, sufficient electricity may not be obtained during the operation of the information processing apparatus 300.

When the power source is instable so that sufficient power cannot be obtained, the processor 210 and the memory 230 need to be quickly shifted to a low power consumption mode. In addition, when the power supply is at the minimum level, the control has to be performed in such a manner that the information that is necessary to restart is saved somewhere else so that the information processing apparatus 300 can be safely suspended. The control has to be further performed so that the apparatus can be restarted when the power supply becomes sufficient for start-up.

The operation of the information processing apparatus 300 incorporating the solar cell 351 that is not a stable power generating device as discussed above is explained below, in which necessary electrical power is obtained from the solar cell 351 or the secondary cell 352.

The situation that the processor 210 is shifted to the sleep mode to reduce the power consumption during the operation when sufficient electricity is supplied to the information processing apparatus 300 is explained. Even when the amount of power generated by the solar cell 351 or the amount of power stored in the secondary cell 352 is sufficient, the power to the processor 210 and the memory 230 is shut off when the processor 210 falls into the idle state.

When, for example, the user enters information on the keyboard and the processor 210 receives data to be processed, the power controlling unit 340 checks the power of the solar cell 351 and the secondary cell 352, and increases the power supply voltages of the processor 210, the memory 230, and the state monitoring unit 120 and activates these devices if there is sufficient power for operation.

When it is judged that the power is insufficient for the information processing apparatus 300 to run, or in other words that the power generated by the solar cell 351 and the power stored in the secondary cell 352 are too little to maintain the operation of the information processing apparatus 300, the power controlling unit 340 starts preparing for shutting the power off to the processor 210 and the memory 230. First, the power controlling unit 340 notifies the processor 210 of an interrupt. In response to the interrupt received from the power controlling unit 340, the processor 210 moves the information in the processor 210 to the memory 230. After the information in the processor 210 is moved to the memory 230, the processor 210 notifies the power controlling unit 340 through the signal line 61 that the internal information has been successfully moved. As a result, the processor 210 can safely shut the power off.

After receiving the notification from the processor 210 that it is ready to shut the power off, the power controlling unit 340 lowers the power supply voltages at the processor 210, the memory 230, and the state monitoring unit 120. As a result, the information processing apparatus 300 is put into the sleep mode.

Figure 8:
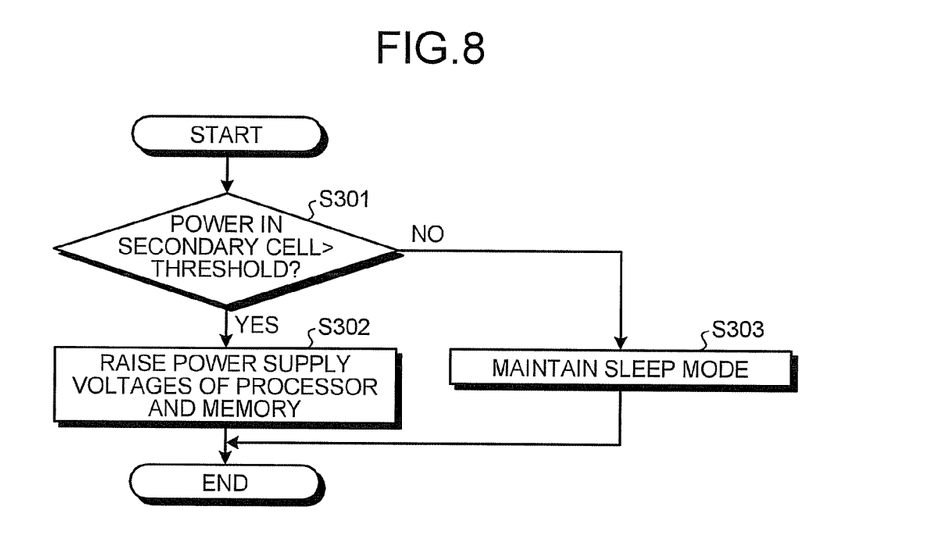
FIG. 8 is a flowchart of a power controlling process in the third embodiment.

The user may enter information on the keyboard during the sleep mode. The operation in such a situation is explained below with reference to FIG. 8. FIG. 8 is a flowchart of the entire power controlling operation in the third embodiment.

When the power controlling unit 340 is operating with the power supplied from the solar cell 351 or the secondary cell 352, the power controlling unit 340 checks, triggered by the input entered by the user, the power in the secondary cell 352 to see if it is sufficient to activate the processor 210 and the memory 230. For example, the power controlling unit 340 determines whether the amount of power stored in the secondary cell 352 is greater than a threshold amount of power (step S301). The threshold may be predetermined as the minimum amount of power required for the processor 210, the memory 230, the state monitoring unit 120, and the power controlling unit 340 to activate.

If the amount of power in the secondary cell 352 is smaller than or equal to the threshold amount (no at step S301), the power controlling unit 340 ignores the user's input and maintains the information processing apparatus 300 in the sleep mode (step S303). When the amount of power sufficient to activate the information processing apparatus 300 is stored in the secondary cell 352 and then an activation event for the information processing apparatus 300 is sent to the power controlling unit 340, or in other words, when the amount of power in the secondary cell is greater than the threshold (yes at step S301), the power controlling unit 340 activates (increases the power supply voltages of) the processor 210, the memory 230, and the state monitoring unit 120 (step S302), and thereby shifts them from the sleep mode to the normal mode.

If the amount of power generated by the solar cell 351 is sufficient but the amount of power charged in the secondary cell 352 is insufficient, the power controlling unit 340 does not activate the information processing apparatus 300. This is because the power generated by the solar cell 351 is unstable so that there is a possibility of power shortage during the start-up, while the power stored in the secondary cell 352 can be stably used. For this reason, the power controlling unit 340 refers to the power stored in the secondary cell 352 at the time of start-up, and if the power is in short, it does not increase the power supply voltages of the processor 210 and the memory 230 until the power stored in the solar cell 351 becomes sufficient for start-up.

As discussed above, when such an unstable solar cell 351 is incorporated and the power stored in the secondary cell 352 is less than or equal to a certain mount, the sleep mode is maintained, and when the power stored in the secondary cell 352 reaches the certain amount again, the processor 210 and the memory 230 are activated. Thus, when the unstable solar cell 351 is included, the information processing apparatus 300 can be normally operated even when the power is in short, by controlling the apparatus in such a manner as not to allow the start-up until the power is recovered.

According to the first to third embodiments, because a non-volatile memory is used as a main memory, information does not need to be moved somewhere else when the power is shut off. Thus, when no access is made to the main memory, the power to the main memory can be immediately shut off, and thereby the power consumption can be reduced. When the main memory is started after the power-down, it is judged whether the main memory is accessible, and control is performed in such a manner that an access is made to the main memory when it becomes accessible. Hence, an error status that is caused when invalidly attempting to read information from the main memory can be avoided.

Modification

According to the above embodiments, when the memory 130 is inaccessible, the processor 110 is notified that the memory 130 is inaccessible. In contrast, the structure may be such that judgment is repeated until the memory 130 becomes accessible, without providing the processor 110 with any notification.

According to this modification, the state monitoring unit 120 judges the state of the memory 130, and transmits to the processor 110 a notification that an access can be made, only when the memory 130 is accessible. For example, the transmitting unit 123 transmits to the processor 110 by way of the bus 51b a notification that the memory 130 is accessible, only when the judging unit 122 sends a judgment result, i.e., only when the memory 130 is accessible.

Figure 9:
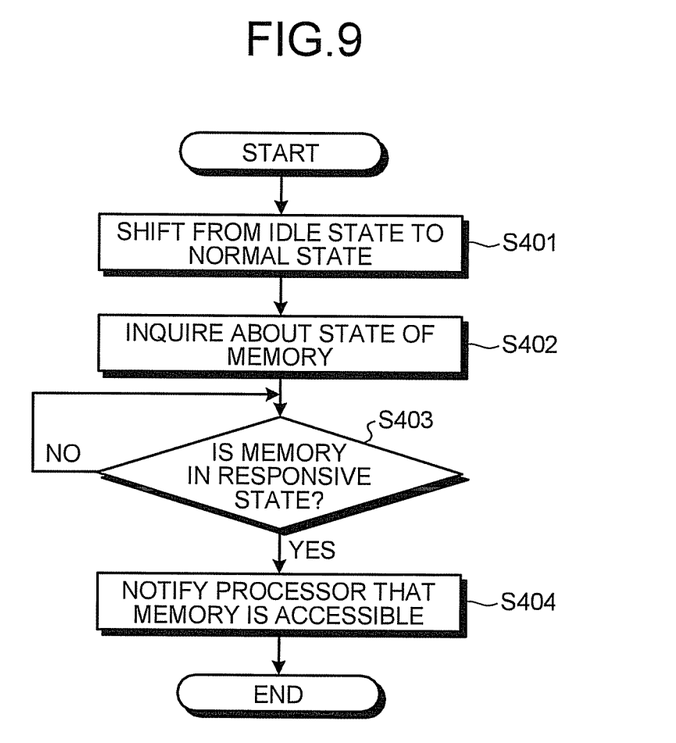
FIG. 9 is a flowchart of a recovering process according to a modification.

FIG. 9 is a flowchart of the entire recovering process according to the modification. Steps S401 and S402 are the same as steps S101 and S102 of FIG. 2, and thus the explanation is omitted.

According to this modification, when judging that the memory 130 is inaccessible (no at step S403), the judging unit 122 repeats the judgment until it becomes accessible. When the memory 130 becomes accessible (yes at step S403), the judging unit 122 notifies the transmitting unit 123 of a judgment result regarding the accessible state. In response to the notification of the judgment result, the transmitting unit 123 notifies the processor 110 that the memory 130 is accessible (step S404).

The program implemented by the information processing apparatus according to the first to third embodiments is stored in a file of an installable or executable format in a computer readable recording medium such as a compact disk read only memory (CD-ROM), a flexible disk (FD), a compact disk recordable (CD-R), and a digital versatile disk (DVD), and provided as a computer program product.

The program executed by the information processing apparatus according to the first to third embodiments may be stored in a computer that is connected to a network such as the Internet, and provided by downloading it through the network. Furthermore, the program executed by the information processing apparatus according to the first to third embodiments may be provided or distributed through a network such as the Internet.

The program according to the first to third embodiments may be provided by storing it in a ROM or the like in advance.

The program executed by the information processing apparatus according to the first to third embodiments has a module structure including the above units (state monitoring unit). The above units are loaded and generated on the main memory when the CPU (processor) reads the program from the recording medium and executes it.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus, comprising:
a processor;
a non-volatile storage unit;
a receiving unit that receives from the processor an inquiry about accessibility of the storage unit;
a judging unit that, upon receipt of the inquiry, judges whether the storage unit is accessible on the basis of a start-up time period between starting power supply to the storage unit and activation of the storage unit; and
a transmitting unit that transmits a judgment result obtained by the judging unit to the processor.

2. The apparatus according to claim 1, wherein, upon receipt of the inquiry, the judging unit judges whether the storage unit is accessible or not on the basis of the start-up time period between starting power supply to the storage unit and activation of the storage unit.

3. The apparatus according to claim 1, wherein the receiving unit further receives time, at which power supply to the storage unit is started, from the processor, and
the judging unit judges that the storage unit is accessible when the start-up time period has elapsed since the time.

4. The apparatus according to claim 1, further comprising a power controlling unit that controls the power supply to the storage unit,
wherein the processor transmits the inquiry after giving the power controlling unit an instruction to supply the power to the storage unit.

5. The apparatus according to claim 4, further comprising a secondary cell that supplies power to the storage unit,
wherein the power controlling unit causes the secondary cell to supply the power to the storage unit when an amount of power in the secondary cell is greater than a predetermined threshold value.

6. The apparatus according to claim 4, further comprising a secondary cell that supplies power to the storage unit,
wherein the power controlling unit judges whether an amount of power in the secondary cell is greater than a predetermined threshold value when an instruction of shifting the processor from a sleep mode to a normal mode is received, shifts the processor from the sleep mode to the normal mode when the amount of power in the secondary cell is greater than the predetermined threshold value, and maintains the processor in the sleep mode when the amount of power in the secondary cell is smaller than or equal to the predetermined threshold value.

7. The apparatus according to claim 1, further comprising a state monitoring unit that monitors a state of the storage unit,
wherein the judging unit counts the number of clock signals of the state monitoring unit after the power is supplied to the storage unit, and judges, upon receipt of the inquiry from the processor about the accessibility of the storage unit, whether the storage unit is accessible on the basis of the number of clock signals.

8. A judging method implemented in an information processing apparatus that includes a processor and a non-volatile storage unit, the method comprising:
receiving from the processor an inquiry about accessibility of the storage unit;
judging, upon receipt of the inquiry, whether the storage unit is accessible on the basis of a start-up time period between starting power supply to the storage unit and activation of the storage unit; and
transmitting a judgment result obtained by the judging to the processor.

* * * * *